United States Patent
Reddy et al.

(10) Patent No.: US 9,342,327 B1
(45) Date of Patent: May 17, 2016

(54) EXTENSIBLE SERVICE EXECUTION FRAMEWORK WITH DATA MAPPING ARCHITECTURE

(71) Applicant: EMC Corporation, Hopkinton, MA (US)

(72) Inventors: Satyapal P. Reddy, Fremont, CA (US); Muthukumarappa Jayakumar, Mountain House, CA (US); Ravikumar Meenakshisundaram, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/135,513

(22) Filed: Dec. 19, 2013

(51) Int. Cl.
*G06F 9/44* (2006.01)
*G06F 9/445* (2006.01)

(52) U.S. Cl.
CPC .................................. *G06F 9/44521* (2013.01)

(58) Field of Classification Search
None
See application file for complete search history.

(56) References Cited

U.S. PATENT DOCUMENTS

| | | | | |
|---|---|---|---|---|
| 7,188,331 B2* | 3/2007 | Culter | ........................... | 717/100 |
| 7,565,443 B2* | 7/2009 | Rossmanith | ............. | G06F 9/546 709/202 |
| 7,974,960 B2* | 7/2011 | Leidig | ................... | G06F 9/4446 707/609 |
| 8,271,609 B2* | 9/2012 | Addala | ................. | G06F 9/5027 706/47 |
| 8,631,386 B2* | 1/2014 | Doshi | ........................ | G06F 8/24 717/106 |
| 2007/0203718 A1* | 8/2007 | Merrifield | .......... | G06Q 10/0635 705/317 |
| 2008/0140760 A1* | 6/2008 | Conner et al. | ................. | 709/201 |
| 2009/0313283 A1* | 12/2009 | Conradi | .............. | G06F 17/3056 |
| 2010/0299357 A1* | 11/2010 | Randall et al. | ................ | 707/769 |

OTHER PUBLICATIONS

Alistair Barros et al "A Critical Overview of the Web Services Choreography Description Language (WS-CDL)", 2005.*

* cited by examiner

*Primary Examiner* — Lechi Truong
*Assistant Examiner* — Abdou Seye
(74) *Attorney, Agent, or Firm* — Van Pelt, Yi & James LLP

(57) ABSTRACT

A service description associated with a service is received. An input data mapping rule from a first caller context to a service context associated with the service is automatically determined at least in part by transforming the service description. A service binding data consumer based at least in part on the service description is created. The service and the input data mapping rule between the first caller context and the service context is automatically executed.

20 Claims, 34 Drawing Sheets

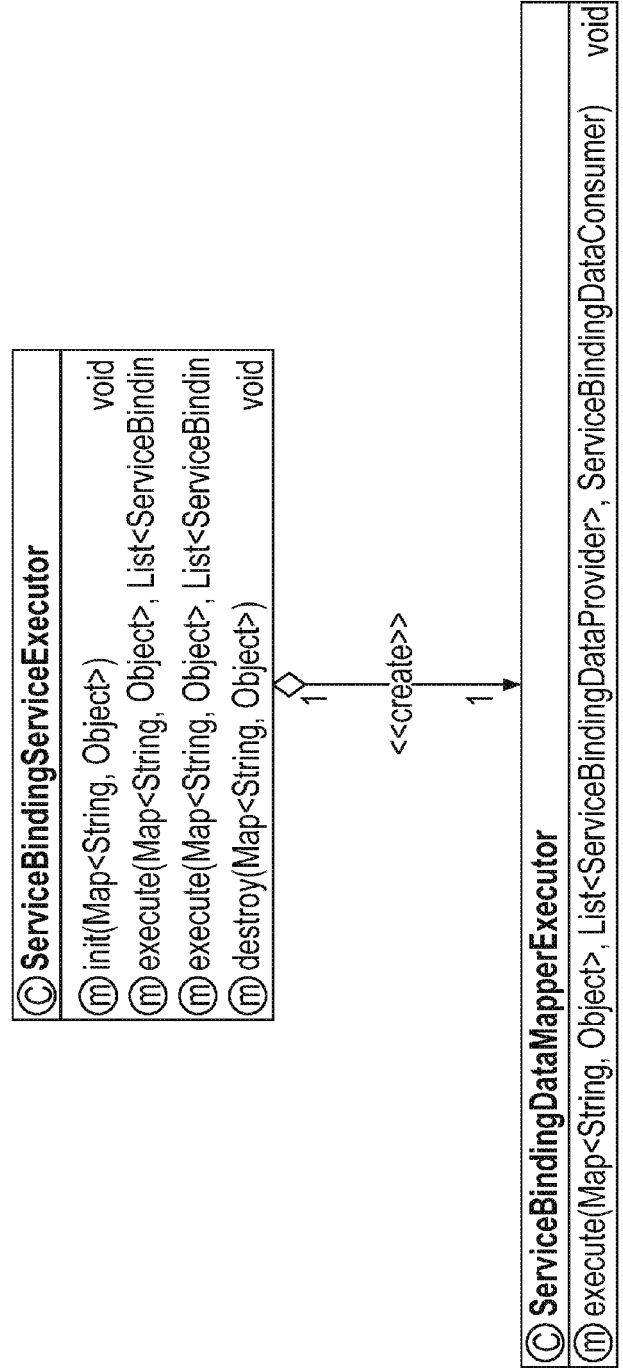

Package com.emc.bpm.runtime.model.service

Interface Summary

| Interface | Description |
|---|---|
| Resource | A destroyable resource |
| ResourceContext | Used to keep track of resources (like file, tcp-connection, ...) that can be managed by the life-cycle of a service execution. |

Class Summary

| Class | Description |
|---|---|
| EndPoint | Service EndPoint definition |
| MappingRule | Used by ServiceBinding to represent a mapping rule that aids in transforming from one logical data-source to another. |
| ResourceContextImpl | This is an internal class and would not have any significance to the implementer of the service. |
| ServiceBinding | Service Binding configuration representation that uses SpEL expression to be able to transform from logical data-source to another. |
| ServiceDefinition | Service Definition is the older style configuration used to transform from logical data-source to another by used limited set of built-in functions. |
| ServiceDefinition.MappingRule | |

Enum Summary

| Enum | Description |
|---|---|
| ServiceDefinition.RULE_TYPE | |
| ServiceDefinition.TARGET_WRITE_OPTION | |

FIG. 6 com.emc.bpm.runtime.model.service
Class EndPoint java.lang.Object
    com.emc.bpm.runtime.model.service.EndPoint

--- public class EndPoint
extends java.lang.Object
Service EndPoint definition

Constructor Summary
Constructors

| Constructor and Description |
|---|
| EndPoint () |

Method Summary
Methods

| Modifier and Type | Method and Description |
|---|---|
| java.util.Map<java.lang.String, java.lang.String> | getEndpointInfo ()<br>EndPoint information as name value pair |

| Methods inherited from class java.lang.Object |
|---|
| clone, equals, finalize, getClass, hashCode, notify, notifyAll, toString, wait, wait, wait |

Constructor Detail
EndPoint public EndPoint ()

Method Detail
getEndpointInfo public java.util.Map<java.lang.String, java.lang.String> getEndpointInfo ()
EndPoint information as name value pair
Returns:
    endpoint info

FIG. 7A com.emc.bpm.runtime.model.service
Class MappingRule java.lang.Object
    com.emc.bpm.runtime.model.service.MappingRule

--- public class MappingRule
extends java.lang.Object
Used by ServiceBinding to represent a mapping rule that aids in transforming from one logical data-source to another.

Constructor Summary

Constructors

| Constructor and Description |
| --- |
| MappingRule (java.lang.String expression, java.lang.String toNode) |

Method Summary

Methods

| Modifier and Type | Method and Description |
| --- | --- |
| java.lang.String | getExpression ()<br>An expression using constants (or variables based on the context of from data tree) |
| java.lang.String | getToNode ()<br>Target node to transform the expression result |

Methods inherited from class java.lang.Object clone, equals, finalize, getClass, hashCode, notify, notifyAll, toString, wait, wait, wait

Constructor Detail

MappingRule public MappingRule (java.lang.String expression, java.lang.String toNode)

Method Detail getExpression public java.lang.String getExpression ()
An expression using constants (or variables based on the context of from data tree)
Returns:
    SpEL expression getToNode public java.lang.String getToNode ()
Target node to transform the expression result
Returns:
    Target node represented as SpEL variable

FIG. 7B com.emc.bpm.runtime.model.service
Class ServiceBinding java.lang.Object
    com.emc.bpm.runtime.model.service.ServiceBinding

--- public class ServiceBinding
extends java.lang.Object

Service Binding configuration representation that uses SpEL expression to be able to transform from logical data-source to another.

| Constructor Summary |
|---|
| Constructors |
| Constructor and Description |
| ServiceBinding (java.lang.String serviceTypeName, EndPoint endPoint) |

| Method Summary | |
|---|---|
| Methods | |
| Modifier and Type | Method and Description |
| java.util.Map<java.lang.String, java.lang.String> | getConfigParams () |
| java.util.List<MappingRule> | getInputBindings () |
| java.util.List<MappingRule> | getOutputBindings () |
| java.util.Set<java.lang.String> | getRepeatingNodes () |
| java.util.Set<java.lang.String> | getSchemaNodes () |
| java.lang.String | getServiceTypeName () |

| Methods inherited from class java.lang.Object |
|---|
| clone, equals, finalize, getClass, hashCode, notify, notifyAll, toString, wait, wait, wait |

| Constructor Detail |
|---|
| ServiceBinding |
| public ServiceBinding (java.lang.String serviceTypeName, EndPoint endPoint) |

| Method Detail |
|---|
| getInputBindings |
| public java.util.List<MappingRule> getInputBindings () |
| getOutputBindings |
| public java.util.List<MappingRule> getOutputBindings () |

FIG. 7C

```
com.emc.bpm.runtime.model.service
Class ServiceDefinition
 java.lang.Object
      com.emc.bpm.runtime.model.service.ServiceDefinition
``` public class ServiceDefinition
extends java.lang.Object
Service Definition is the older style configuration used to transform from logical data-source to another by used limited set of built-in functions.

Nested Class Summary

Nested Classes

| Modifier and Type | Class and Description |
|---|---|
| static class | ServiceDefinition.MappingRule |
| static class | ServiceDefinition.RULE_TYPE |
| static class | ServiceDefinition.TARGET_WRITE_OPTION |

Constructor Summary

Constructors

| Constructor and Description |
|---|
| ServiceDefinition () |
| ServiceDefinition (java.lang.String serviceTypeName) |

Method Summary

Methods

| Modifier and Type | Method and Description |
|---|---|
| java.util.Map<java.lang.String, java.lang.String> | getConfigParams () |
| java.util.List<ServiceDefinition.MappingRule> | getInputBindings () |
| java.util.List<ServiceDefinition.MappingRule> | getOutputBindings () |
| java.lang.String | getServiceTypeName () |

Methods inherited from class java.lang.Object clone, equals, finalize, getClass, hashCode, notify, notifyAll, toString, wait, wait, wait

Constructor Detail

ServiceDefinition public ServiceDefinition ()

ServiceDefinition public ServiceDefinition (java.lang.String serviceTypeName)

FIG. 7D com.emc.bpm.runtime.model.service
Class ServiceDefinition.MappingRule
 java.lang.Object
       com.emc.bpm.runtime.model.service.ServiceDefinition.MappingRule
 Enclosing class:
        ServiceDefinition public static class ServiceDefinition.MappingRule
extends java.lang.Object

Constructor Summary
Constructors

| Constructor and Description |
|---|
| ServiceDefinition.MappingRule () |
| ServiceDefinition.MappingRule (java.lang.String [ ] fromNodes, java.lang.String toNode, ServiceDefinition.TARGET_WRITE_OPTION writeOption, ServiceDefinition.RULE_TYPE ruleType, java.lang.String functionName) |

Method Summary
Methods

| Modifier and Type | Method and Description |
|---|---|
| java.util.List<java.lang.String> | getFromNodes () |
| java.lang.String | getFunctionName () |
| ServiceDefinition.RULE_TYPE | getRuleType () |
| java.lang.String | getToNode () |
| ServiceDefinition.TARGET_WRITE_OPTION | getWriteOption () |

Methods inherited from class java.lang.Object clone, equals, finalize, getClass, hashCode, notify, notifyAll, toString, wait, wait, wait

Constructor Detail
ServiceDefinition.MappingRule public ServiceDefinition.MappingRule ()

ServiceDefinition.MappingRule public ServiceDefinition.MappingRule (java.lang.String [ ] fromNodes,
                    java.lang.String toNode,
                    ServiceDefinition.TARGET_WRITE_OPTION writeOption,
                    ServiceDefinition.RULE_TYPE ruleType,
                    java.lang.String functionName)

FIG. 7E

```
com.emc.bpm.runtime.model.service
Interface Resource public interface Resource
A destroyable resource
```

Method Summary

Methods

| Modifier and Type | Method and Description |
|---|---|
| void | destroy ()<br>Typically used to clean up / close connection to any connected or opened resource. |

Method Detail destroy

```
void destroy ()
        throws java.lang.Exception
```
Typically used to clean up / close connection to any connected or opened resource.
Throws:
    java.lang.Exception

FIG. 7F com.emc.bpm.runtime.model.service
Interface ResourceContext

All Known Implementing Classes:
    ResourceContextImpl public interface ResourceContext
Used to keep track of resources (like file, tcp-connection, ...) that can be managed by the life-cycle of a service execution.

Method Summary

Methods

| Modifier and Type | Method and Description |
|---|---|
| void | addResource (java.lang.String key, Resource res) |
| void | destroy () |
| Resource | getResource (java.lang.String key) |

Method Detail addResource void addResource (java.lang.String key, Resource res)

getResource

Resource getResource (java.lang.String key)

destroy void destroy ()

FIG. 7G

```
com.emc.bpm.service
```
Class ServiceFactory Registry

```
java.lang.Object
      com.emc.bpm.service.ServiceFactoryRegistry
``` public class ServiceFactoryRegistry
extends java.lang.Object
Service discovery class

| Constructor Summary |
|---|
| Constructors |
| Constructor and Description |
| ServiceFactoryRegistry ( ) |

| Method Summary | |
|---|---|
| Methods | |
| Modifier and Type | Method and Description |
| void | addServiceFactory (ServiceFactory factory)<br>This method is used by Bean Post Processor to add a given service factory to this registry. |
| ServiceFactory | getServiceFactory (java.lang.String serviceName)<br>Finds the service factory handle for a given service name |
| void | setServiceFactories (java.util.List<ServiceFactory> serviceFactories)<br>This method is used by Spring BluePrint to register all service factories |

| Methods inherited from class java.lang.Object |
|---|
| clone, equals, finalize, getClass, hashCode, notify, notifyAll, toString, wait, wait, wait |

| Constructor Detail |
|---|
| ServiceFactoryRegistry |
| public ServiceFactoryRegistry ( ) |

FIG. 9A

Method Detail getServiceFactory public ServiceFactory getServiceFactory (java.lang.String serviceName)
Finds the service factory handle for a given service name
Parameters:
    serviceName - service identifier
Returns:
    Service factory (null otherwise)

addServiceFactory public void addServiceFactory (ServiceFactory factory)
This method is used by Bean Post Processor to add a given service factory to this registry.
Typically used in an non-OSGi environment
Parameters:
    factory - discovered service setServiceFactories public void setServiceFactories (java.util.List<ServiceFactory> serviceFactories)
This method is used by Spring BluePrint to register all serviceFactories
Parameters:
    serviceFactories - discovered services

FIG. 9A (Cont.)

com.emc.bpm.service
Interface Service<REQUEST extends DataConsumer, RESPONSE extends DataProvider> public interface Service<REQUEST extends DataConsumer, RESPONSE extends DataProvider>

Method Summary

Methods

| Modifier and Type | Method and Description |
|---|---|
| REQUEST | createServiceRequestDataConsumer (java.util.Map<java.lang.String, java.lang.Object> context, java.util.List<? extends DataProvider> fromRequestDataProviders)<br>This method returns the Service's Data Consumer which will be used to set values before service invocation |
| void | destroy (java.util.Map<java.lang.String, java.lang.Object> context)<br>Any resources created in the init method have to be destroyed here |
| void | init (java.util.Map<java.lang.String, java.lang.Object> context, java.util.Map<java.lang.String, java.lang.String> endpointInfo)<br>This method initialized any resources (e.g. |
| RESPONSE | invokeService (java.util.Map<java.lang.String,java.lang.Object> context, REQUEST serviceRequestDataConsumer) |
| void | postExecuteService (java.util.Map<java.lang.String, java.lang.Object> context, REQUEST serviceRequestDataConsumer, RESPONSE responseDataProvider) |

Method Detail init void init (java.util.Map<java.lang.String, java.lang.Object> context,
          java.util.Map<java.lang.String, java.lang.String> endpointInfo)
              throws ServiceInitializationException This method initialized any resources (e.g. JMS Connection) and that can be reused across multiple invoke services

Parameters:
  context-
  endpointInfo - This Map represents the endpoint information, e.g. Email Host and Port etc.,

Throws:
  ServiceInitializationException

FIG. 9B com.emc.bpm.service
Interface ServiceFactory

All Known Subinterfaces:
    BPMServiceFactory public interface ServiceFactory
An implementation of this interface enables participation of using a service in service execution (in a BPM activity or in Event execution or other supported runtime systems)

| Method Summary | |
|---|---|
| Methods | |
| Modifier and Type | Method and Description |
| Service | createService ( ) <br> This method creates a new service |
| java.lang.String | getServiceName ( ) <br> This method is used as an identifier to discover a service. |

Method Detail createService
Service createService ( )
This method creates a new service
Returns:
    Service object getServiceName
java.lang.String getServiceName ( )
This method is used as an identifier to discover a service. Services are typically discovered based on configuration provided using ServiceDefinition or ServiceBinding format.
Returns:
    Service identifier

FIG. 9C com.emc.bpm.service.mapper - Mozilla Firefox

File Edit View History Bookmarks Tools Help com.emc.bpm.service.mapper

Overview Package Class Tree Deprecated Index Help
Prev Package Next Package    Frames  No Frames    All Classes

Package com.emc.bpm.service.mapper

Interface Summary

| Interface | Description |
| --- | --- |
| BPMServiceFactory | A Service Factory extension that provides support for ServiceBinding and/or ServiceDefinition abstraction in order to enable a Service Implementer to call the service from ServiceBinding / ServiceDefinition |
| BPMServiceFactoryRegistryService | Service discovery interface |
| ServiceBindingDataConsumer | Interface to aid in setting values to a Data Tree for a configuration provided using Service Binding |
| ServiceBindingDataProvider | Interface to aid in getting values from a Data Tree for a configuration based on Service Binding |
| ServiceDefinitionDataConsumer<DATANODE extends com.emc.bpm.service.sd.DataNode> | Interface to aid in setting values to a Data Tree for a configuration provided using Service Definition |
| ServiceDefinitionDataProvider<DATANODE extends com.emc.bpm.service.sd.DataNode> | Interface to aid in getting values from a Data Tree for a configuration based on Service Definition |

Class Summary

| Class | Description |
| --- | --- |
| BPMServiceFactoryRegistryServiceImpl | Service discovery class |
| ServiceContextConstants | Constants used by internal implementation. |
| ServiceHandler | Context class that allows inter-operability with non-spring classes. |

Overview Package Class Tree Deprecated Index Help
Prev Package Next Package    Frames  No Frames    All Classes

FIG. 10 com.emc.bpm.service.mapper
Class BPMServiceFactoryRegistryServiceImpl java.lang.Object
    com.emc.bpm.service.mapper.BPMServiceFactoryRegistryServiceImpl

All Implemented Interfaces:
    BPMServiceFactoryRegistryService public class BPMServiceFactoryRegistryServiceImpl
extends java.lang.Object
implements BPMServiceFactoryRegistryService Service discovery class

Constructor Summary

| Constructors |
|---|
| Constructor and Description |
| BPMServiceFactoryRegistryServiceImpl () |

Method Summary

| Methods | |
|---|---|
| Modifier and Type | Method and Description |
| void | addServiceFactory (BPMServiceFactory factory) <br> This method is used by Bean Post Processor to add a given service factory to this registry. |
| BPMServiceFactory | getServiceFactory (java.lang.String serviceName) <br> Finds the service factory handle for a given service name |
| void | setServiceFactories (java.util.List<BPMServiceFactory> serviceFactories) <br> This method is used by Spring BluePrint to register all service factories |

| Methods inherited from class java.lang.Object |
|---|
| clone, equals, finalize, getClass, hashCode, notify, notifyAll, toString, wait, wait, wait |

Constructor Detail

| BPMServiceFactoryRegistryServiceImpl |
|---|
| public BPMServiceFactoryRegistryServiceImpl () |

FIG. 11

Method Detail getServiceFactory public BPMServiceFactory getServiceFactory (java.lang.String serviceName)
Finds the service factory handle for a given service name
Specified by:
  getServiceFactory in interface BPMServiceFactoryRegistryService
Parameters:
  serviceName - service identifier
Returns:
  service factory (null otherwise)

addServiceFactory public void addServiceFactory (BPMServiceFactory factory)
This method is used by Bean Post Processor to add a given service factory to this registry. Typically used in an non-OSGi environment
Specified by:
  addServiceFactory in interface BPMServiceFactoryRegistryService
Parameters:
  factory - discovered service setServiceFactories public void setServiceFactories (java.util.List<BPMServiceFactory> serviceFactories)
This method is used by Spring BluePrint to register all service factories
Specified by:
  setServiceFactories in interface BPMServiceFactoryRegistryService
Parameters:
  serviceFactories - discovered services

FIG. 11 (Cont.)

| ⊛ com.emc.bpm.service.sb - Mozilla Firefox | ⬌ ⬜ ⊠ |
|---|---|

File Edit View History Bookmarks Tools Help

☐ com.emc.bpm.service.sb    [+]

Overview [Package] Class Tree Deprecated Index Help
Prev Package  Next Package    Frames  No Frames    All Classes

Package com.emc.bpm.service.sb

Class Summary

| Class | Description |
|---|---|
| RootDataProvider | This is an internal class and would not have any significance to the implementer of the service. |
| ServiceBindingDataMapperExecutor | This is a framework class that allows execution of mapping rules during the execution of every service binding configuration. This is an internal class and would not have any significance to the implementer of the service. |
| ServiceBindingServiceExecutor | This class executes any 'service'. |
| ServiceBindingVariableTypeInfoProvider | This is a framework class that allows getting more info on variables using in an expression that's part of ServiceBinding configuration. |

Overview [Package] Class Tree Deprecated Index Help
Prev Package  Next Package    Frames  No Frames    All Classes

FIG. 12 com.emc.bpm.service.sb
Class ServiceBindingServiceExecutor
java.lang.Object
    com.emc.bpm.service.sb.ServiceBindingServiceExecutor

--- public class ServiceBindingServiceExecutor
extends java.lang.Object
This Class executes any 'service'. A 'service' is an execution logic for an automatic activity. This service executor is based on ServiceBinding. Theoretically, there can be other kind of executors that may be more suitable in an non-automatic activity context.

Constructor Summary

Constructors

| Constructor and Description |
|---|
| ServiceBindingServiceExecutor(BPMServiceFactoryRegistryService registry, com.emc.bpm.expression.converter.spel.SpELExpressionBuilder builder, ServiceBinding serviceBinding) |
| ServiceBindingServiceExecutor(org.w3c.dom.Document serviceBindingDocument) |

Method Summary

Methods

| Modifier and Type | Method and Description |
|---|---|
| void | destroy(java.util.Map<java.lang.String, java.lang.Object> context) Service Cleanup during shutdown of the service and/or when the service is not required to be loaded in memory. |
| void | execute(java.util.Map<java.lang.String, java.lang.Object> context, java.util.List<ServiceBindingDataProvider> fromRequestDataProviders) Execute a service that does not have any output mapping. |
| void | execute(java.util.Map<java.lang.String, java.lang.Object> context, java.util.List<ServiceBindingDataProvider> fromRequestDataProviders, ServiceBindingDataConsumer toResponseDataConsumer) Execute a service that have both input and output mapping |
| void | init(java.util.Map<java.lang.String, java.lang.Object> context) Initialize a service provided in the service binding configuration |

| Methods inherited from class java.lang.Object |
|---|
| clone, equals, finalize, getClass, hashCode, notify, notifyAll, toString, wait, wait, wait |

FIG. 13A

| Construtor Detail |
|---|
| ServiceBindingServiceExecutor |
| public ServiceBindingServiceExecutor(org.w3c.dom.Document serviceBindingDocument)<br>                        throws javax.xml.transform.TransformerException<br>Throws:<br>    javax.xml.transform.TransformerException |
| ServiceBindingServiceExecutor |
| public ServiceBindingServiceExecutor (BPMServiceFactoryRegistryService registry, com.emc.bpm.<br>                        expression.converter.spel.SpELExpressionBuilder builder,<br>                        ServiceBinding serviceBinding) |

| Method Detail |
|---|
| init |
| public void init (java.util.Map<java.lang.String,java.lang.Object> context)<br>      throws ServiceInitializationException<br>Initialize a service provided in the service binding configuration.<br>Parameters:<br>    context - context used for processing the init() when the service is initialized.<br>Throws:<br>    ServiceInitializationException - when initialization fails. |
| execute |
| public void execute(java.util.Map<java.lang.String, java.lang.Object> context,<br>        java.util.List<ServiceBindingDataProvider> fromRequestDataProviders)<br>        throws ServiceExecutionException<br>Execute a service that does not have any output mapping.<br>Parameters:<br>    context - context used for processing the execution of service.<br>    fromRequestDataProviders - Data Providers that participate in the service binding<br>    (Ex: ProcessDataProvider when used in an BPM Activity)<br>Throws:<br>    ServiceExecutionException - when execution fails. |

FIG. 13B execute

```
public void execute (java.util.Map<java.lang.String, java.lang.Object> context,
        java.util.List<ServiceBindingDataProvider> fromRequestDataProviders,
        ServiceBindingDataConsumer toResponseDataConsumer)
              throws ServiceExecutionException
```
Execute a service that have both input and output mapping.

Parameters:
    context - context used for processing the execution of service.
    fromRequestDataProviders - Data Providers that participate in the service binding
    (Ex: ProcessDataProvider when used in an BPM Activity)
    toResponseDataConsumer - Data Consumers that participate in the service binding
    (Ex: ProcessDataConsumer when used in an BPM Activity)

Throws:
    ServiceExecutionException - when execution fails.

destroy

```
public void destroy (java.util.Map<java.lang.String, java.lang.Object> context)
```
Service Cleanup during shutdown of the service and/or when the service is not required to be loaded in memory.

Parameters:
    context - Context used by the service to clean-up it's initialized resources.

EXTENSIBLE SERVICE EXECUTION FRAMEWORK WITH DATA MAPPING ARCHITECTURE

BACKGROUND OF THE INVENTION

A business process management ("BPM") engine provides orchestration for sequences of business activities (called a "business process" or simply "process") in an asynchronous, reliable, and stateful manner.

The business process may be defined as an activity flow model, typically declared using a procedural markup language, for example in eXtensible Markup Language ("XML"). An "activity" represents either human performed tasks or automated software/web services ("Service") accessed, for example, through an application programming interface ("API"). Services may be invoked from more than within a BPM business process, for example a business process ("Process"), a business event ("Event") and/or a Java application; collectively these are referred to throughout this specification as a "Caller".

It would be advantageous to invoke a Service in an extensible execution framework.

BRIEF DESCRIPTION OF THE DRAWINGS

Various embodiments of the invention are disclosed in the following detailed description and the accompanying drawings.

FIG. 4D is a class diagram illustrating a Service binding relationship.

FIG. 6 is an illustration of an embodiment for a run-time model Service package in an API.

FIGS. 7A, 7B, 7C, 7D, 7E, 7F, and 7G are illustrations of an embodiment for classes and interfaces within the run-time model Service package.

FIGS. 9A, 9B, and 9C are illustrations of an embodiment for classes and interfaces within the Service package.

FIG. 10 is an illustration of an embodiment for a Service mapper package in an API.

FIG. 11 is an illustration of an embodiment for a class within the Service mapper package.

FIG. 12 is an illustration of an embodiment for a Service SB package in an API.

FIGS. 13A, 13B, and 13C are an illustration of an embodiment for a Service binding Service executor class.

DETAILED DESCRIPTION

Figure 1:
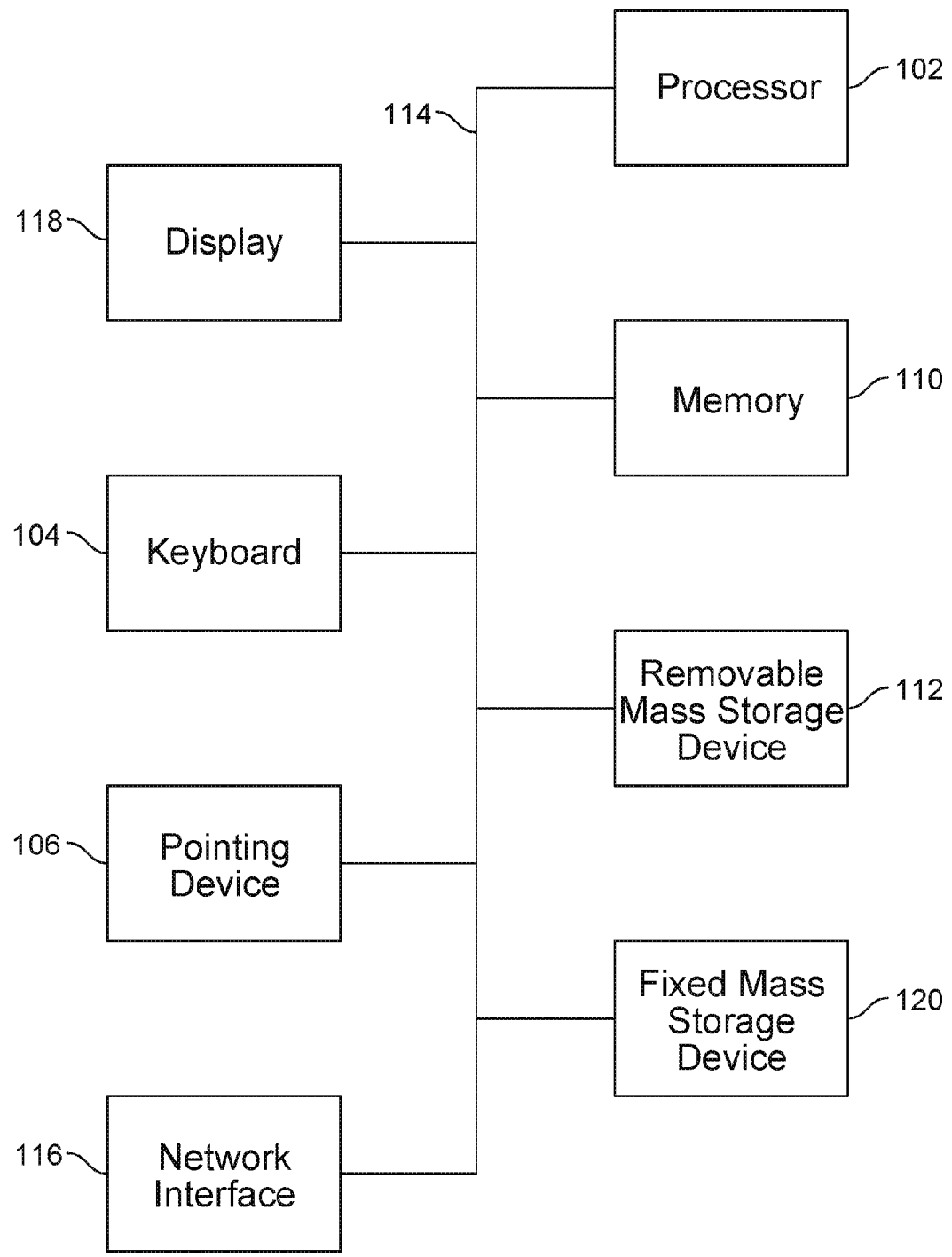
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An extensible Service execution framework with a data mapping architecture is disclosed. A Service may be defined throughout this specification as a—service that may for example send an email, call a web service associated with a Representational State Transfer ("REST") architectural style, perform basic data transformation, or perform any custom service creatable. A Service may be designed by a third-party.

In one embodiment, using the Service involves a design-time (tooling) stage wherein data mapping rules from the Caller's context to the Service context are established. Data mapping rules may include expressions and/or notations. The Caller context may be that associated with a Process and/or an Event. Using the Service also involves a run-time stage to execute the mapping rules while invoking the actual Service.

In one embodiment, a Service can be invoked from within a BPM, from Events, or from plain Java. In one embodiment, a Service is wrapped up in higher level abstractions of data mapping between Caller context and Service context in a generic fashion. The data mapping notations may customized to be suitable to specific contexts e.g. based on the context tree of a data model.

In one embodiment, an activity template within a Process does input data mapping from Process variables, that is the Caller context, into an email Service. Output mappings may also be determined to map back from the Service, for example a MessageId from email service, to Process variables within the BPM system. An architectural philosophy is disclosed that if Service designers adhere to a generic extensible service execution framework described below, then the data mapping architecture can be automatically implemented at design-time and run-time without custom code. This framework may be used in a variety of systems including EMC Documentum xCP Designer, as well as runtime execution of generic systems, for example Java-based systems.

Three key components on the design-time comprise:
Determining mapping rules from Caller context to Service Context;
Determining mapping rules from Service context to Caller Context; and
Determining the Service type name string, which is used to discover and invoke the actual service.

Two key components on the run-time phase comprise:
Creating a Service based on the Service type name, for example using a class/interface (known throughout this specification as a "ServiceFactory" interface) to enable participation of using the Service in service execution, including in a BPM activity, Event execution, or another supported run-time system; and
Creating the associated Service, including executing input mappings, executing the service, and executing output mappings, for example using a class/interface (known throughout this specification as a "ServiceBindingServiceExecutor" class) to executes any Service, including an execution logic for an automatic activity.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In one embodiment, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The block processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
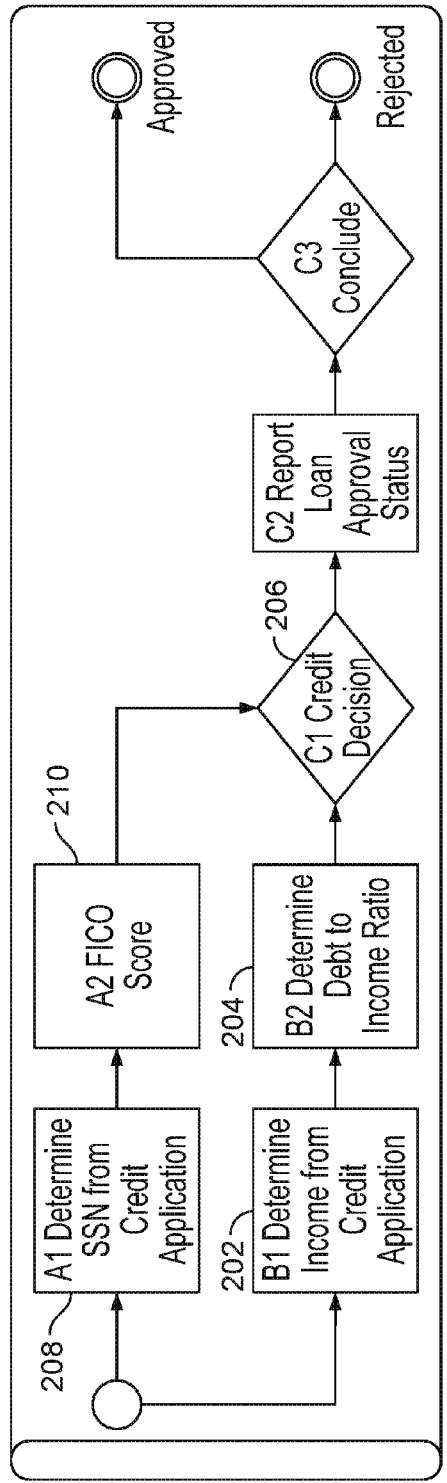
FIG. 2A is a block diagram of a process defined in a flow model.

FIG. 2A is a block diagram of a process defined in a flow model. Without loss of generality the process may be defined by proprietary, de facto or industry standards may be used, for example the Business Process Model and Notation ("BPMN") standard, expressed in a markup language, for example XML, the XML Process Definition Language ("XPDL") and/or the Business Process Execution Language ("BPEL"). The example given in FIG. 2A is a loan approval process which includes two parallel activities to reach a credit decision (206); a determination of income from a credit application (202) and a determination of a debt to income ratio (204), and on a second path a determination of a social security number ("SSN") from a credit application (208) and a determination of a credit score ("FICO score") by invoking a (third-party) service (210) that can transform a SSN to a FICO score.

Figure 2B:
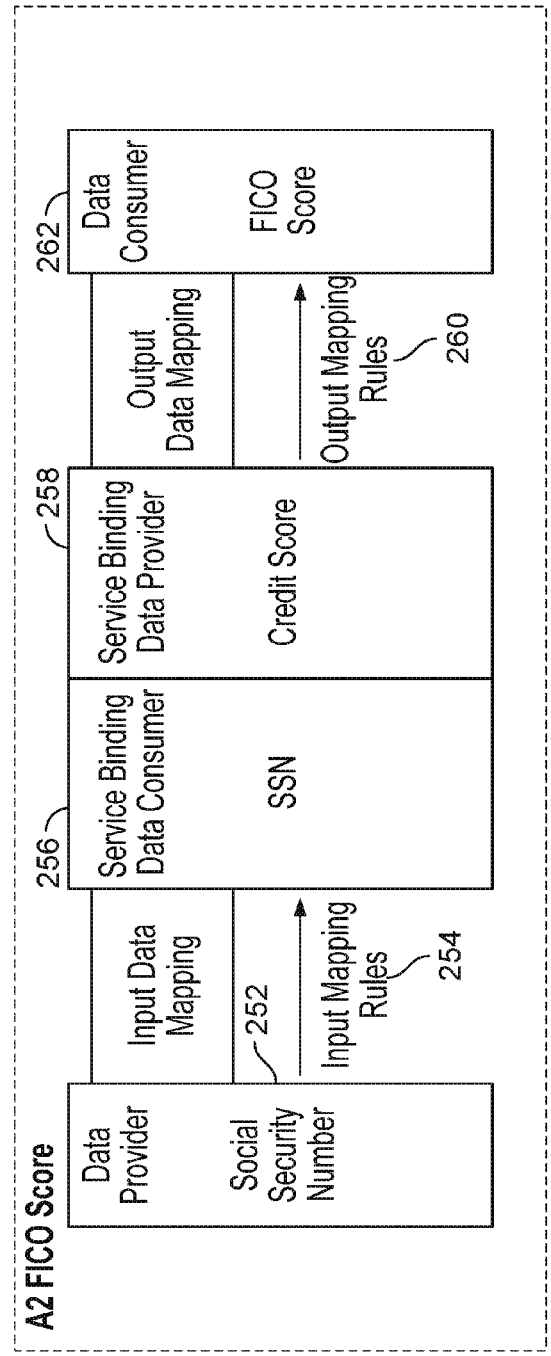
FIG. 2B is a block diagram illustrating a data mapping architecture for the credit score example.

FIG. 2B is a block diagram illustrating a data mapping architecture for the credit score example. In one embodiment, the diagram in FIG. 2B may exist conceptually in 210 of FIG. 2A. The data provider (252), for example the BPM system in FIG. 2A, provides a social security number in a specified format. Input mapping rules (254) map the social security number in a particular way to form a "SSN" in the Service binding data consumer (256) in another specified format suitable for consumption by the (third-party) Service referenced in 210. The Service after transforming the SSN provides a "Credit Score" in a specified format as shown in the Service binding data provider (258), wherein output mapping rules (260) then map the credit score in a particular way to form a "FICO Score" in the data consumer (262) suitable for consumption by the BPM system in FIG. 2A.

Figure 3:
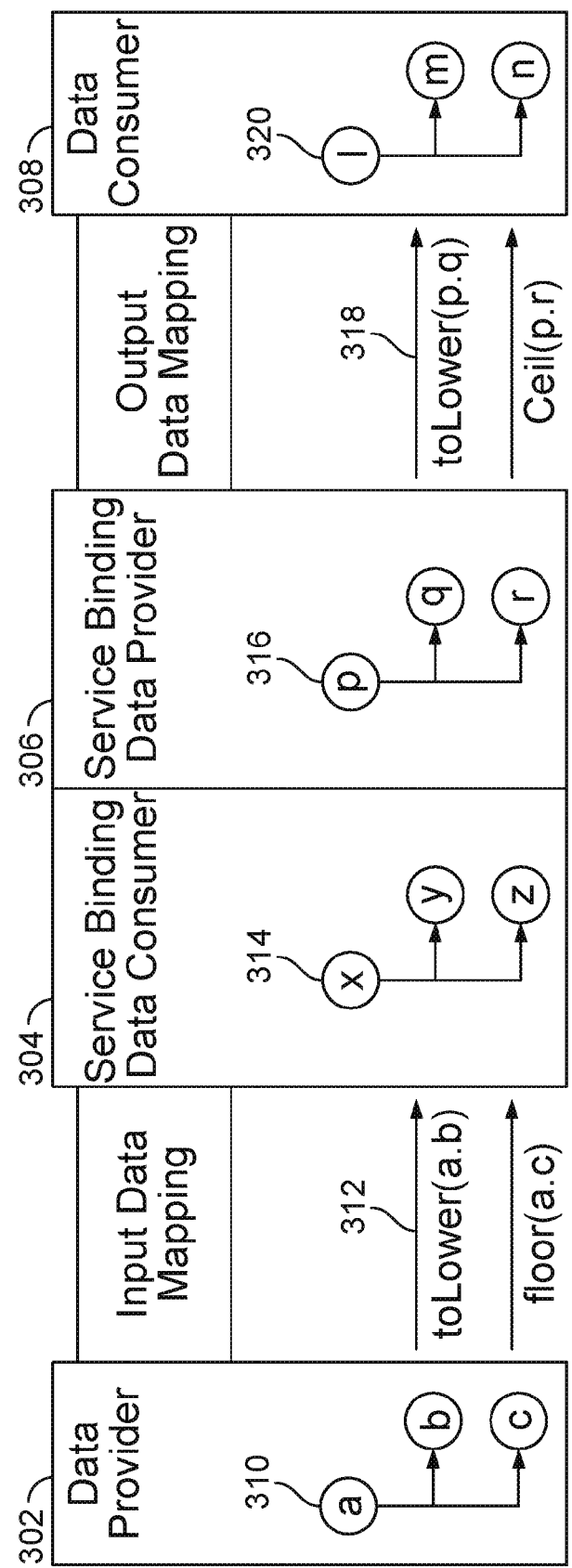
FIG. 3 is a block diagram illustrating a data mapping architecture.

FIG. 3 is a block diagram illustrating a data mapping architecture. In one embodiment, the diagram in FIG. 3 is a generic philosophy for the example in FIG. 2B. FIG. 3 illustrates a Caller (302) calling Service with data mapping between Caller context and Service context and then data being mapped from Service context back to Caller context (308). The Service binding data consumer (304) and Service binding data provider (306) support the data mapping expressions and/or notations based on the context tree of the data model.

In one embodiment, it is based on other notations, for example legacy data mapping notations to ensure easy migration to the overall framework.

As shown in FIG. 3, the data provider (302) includes data in a specified format shown as a, b, c, with hierarchical relationship (310), which uses an input data mapping (312) to provide to Service binding data consumer (304) data in a specified format shown as x, y, z with other hierarchical relationship (314). An example of the hierarchical relationship includes that of a "context data tree" as described in greater detail in U.S. patent application Ser. No. 13/626,199 entitled "DATA MODEL BASED CONTEXT TREE", which is incorporated herein by reference for all purposes. In the example shown, (312) includes string function "toLower" on data node a.b and number function "floor" on data node a.c. After the Service has executed on (314), it provides data from Service binding data provider (306) in a specified format shown as p, q, r with other hierarchical relationship (316). Output data mapping (318) transforms data (316) to a consumable format shown as l, m, n with other hierarchical relationship (320). For BPM, the two context trees will be the same based on the Process variables context tree, for example a, b, c, being the same as l, m, n. In one embodiment, a,b,c, and l,m,n are different when multiple services are sequenced.

In the example shown, (318) includes string function "toLower" on data nodes p, q and number function "ceil" on data nodes p, r.

In one embodiment, an overall executing sequence follows this order:
1) When data mapping expressions/notations are evaluated, it will first map the data from Caller context into a data consumer object to be used by the Service. For example, an input mapping (312) may set a "MailTo" address, "Subject" and "Body" (314) for an email Service;
2) With the values set by the input mapping (312), the Service is invoked, that is email is sent; and
3) Once the Service execution completes, it will execute the output data mapping (318) and set the values to the Caller context. For example, an output may be an email message identification number set to a Process variable in a BPM Process (320).

Unlike traditional simple data mapping, one embodiment includes a design-time and run-time framework for being a data mapping architecture for an extensible service execution framework, embeddable in any framework that requires some sort of service execution, like BPM systems. The advantages over traditional simple data mapping include:
1. Being able to call in multiple contexts, as it is not completely static and/or tied with a particular Process or Service;
2. Being extensible to legacy (using legacy notations as described above), current, and future third-party Services; and
3. Having different types of expressions and/or mapping rules for different contexts.

The framework creates an entire ecosystem from design-time that creates mapping rules based on the Service selection to run-time.

Figure 4A:
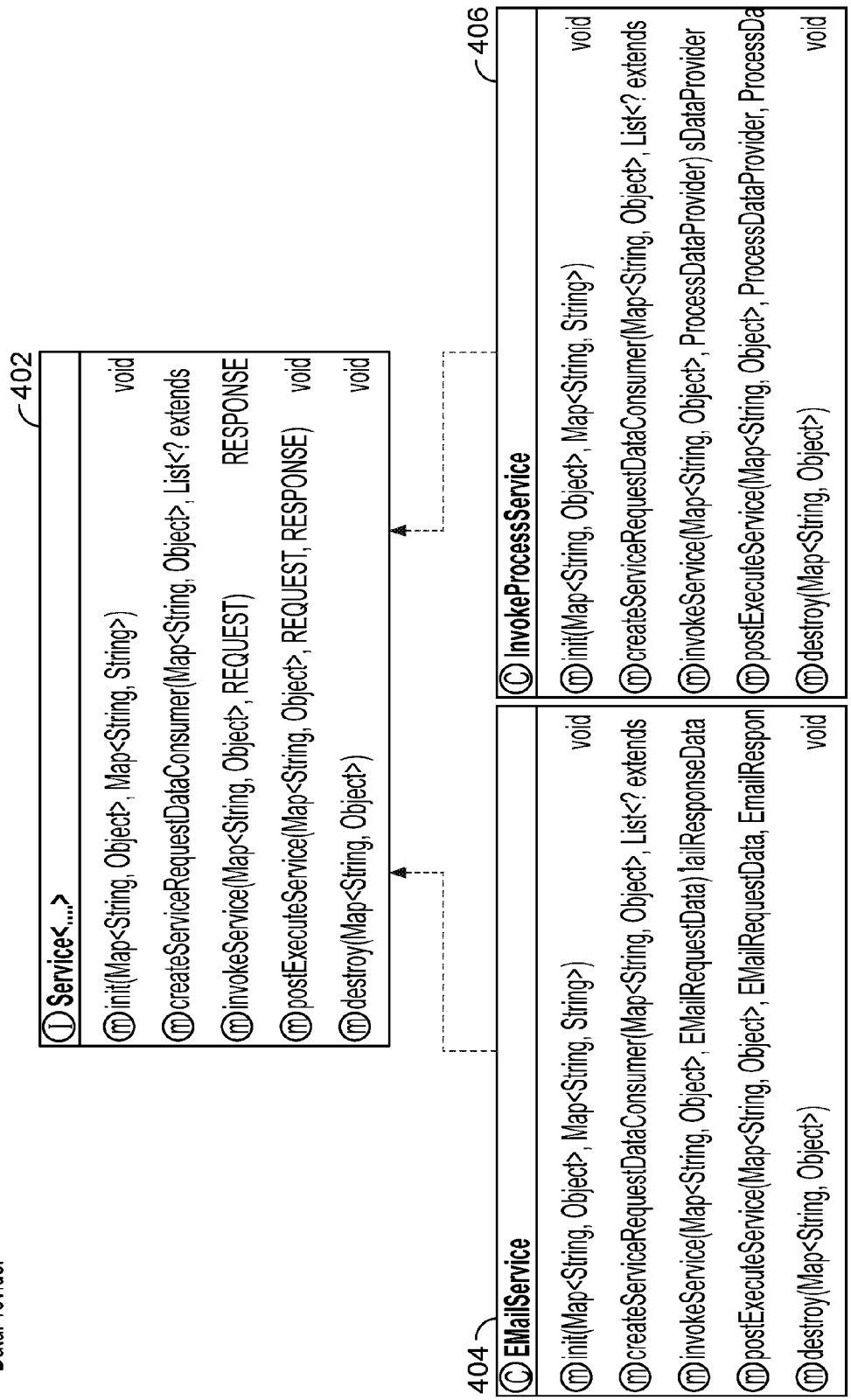
FIG. 4A is a class diagram illustrating a Service interface.

FIG. 4A is a class diagram illustrating a Service interface. Interface Service< > 402 is implemented by various Service classes, for example a third-party email Service class (404) as well as a Process Service class (406). The public interface Service extends DataConsumer by REQUEST and extends DataProvider by RESPONSE.

Figure 4B:
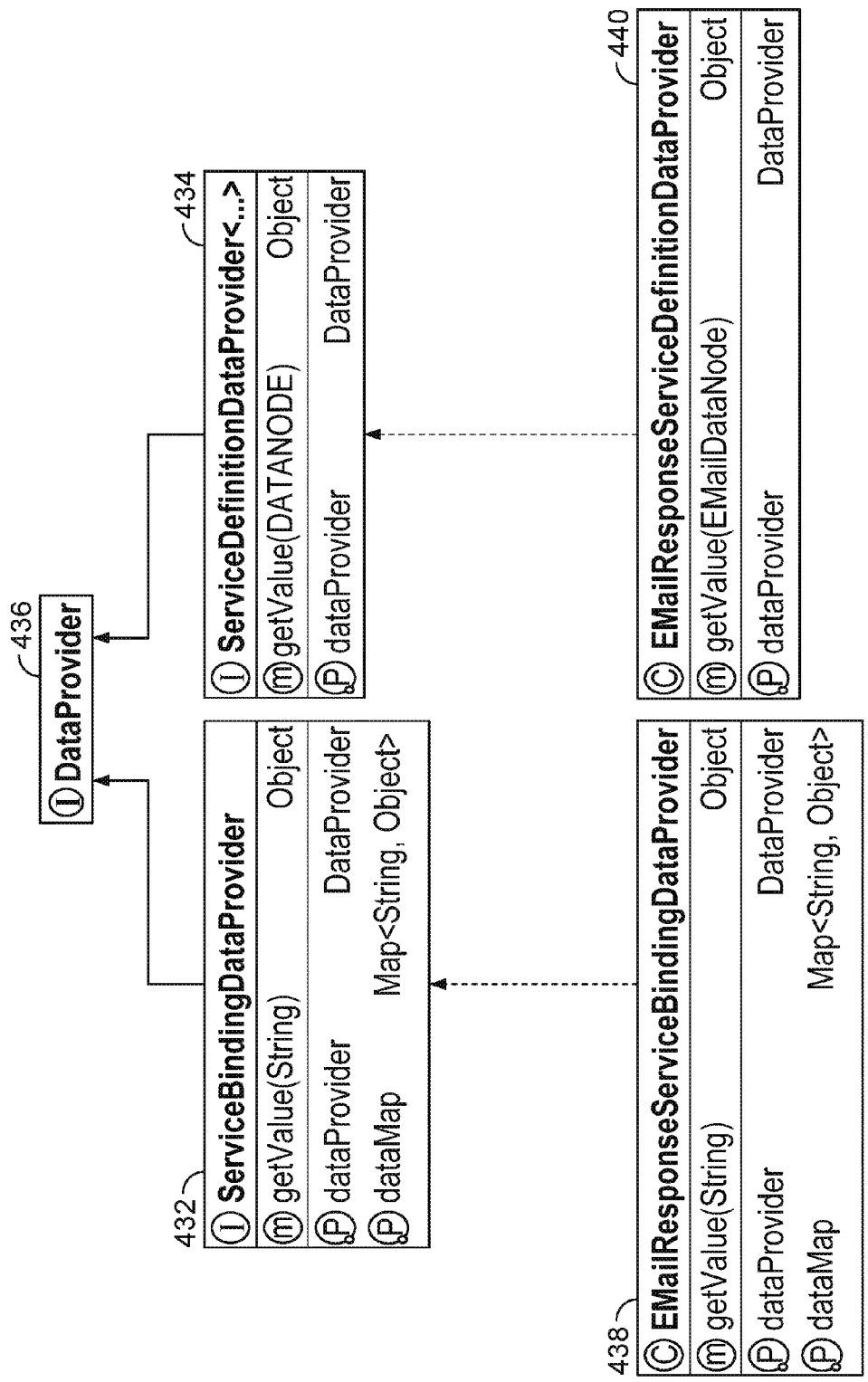
FIG. 4B is a class diagram illustrating a data provider interface.

FIG. 4B is a class diagram illustrating a data provider interface. Both interfaces ServiceBindingDataProvider (432) and ServiceDefinitionDataProvider (434) inherit from interface DataProvider (436). The EmailResponseServiceBindingDataProvider class (438) implements interface ServiceBindingDataProvider (432) and EmailResponseServiceDefinitionDataProvider class (440) implements interface ServiceDefinitionDataProvider (434). In one embodiment, a Service "definition" data provider is a legacy notation for a Service that has not been updated with a public API, for example the service associated with EmailResponseServiceDefinitionDataProvider (440), and thus does not have the dataMap in EmailResponseServiceBindingDataProvider (438). This illustrates one could retrofit existing legacy mapping rules into new framework and thus also support any new mapping rule notations. By also having the capability to refer to legacy notation, one unique feature that this framework provides is the capability to extend any new type of mapping rules in future.

Figure 4C:
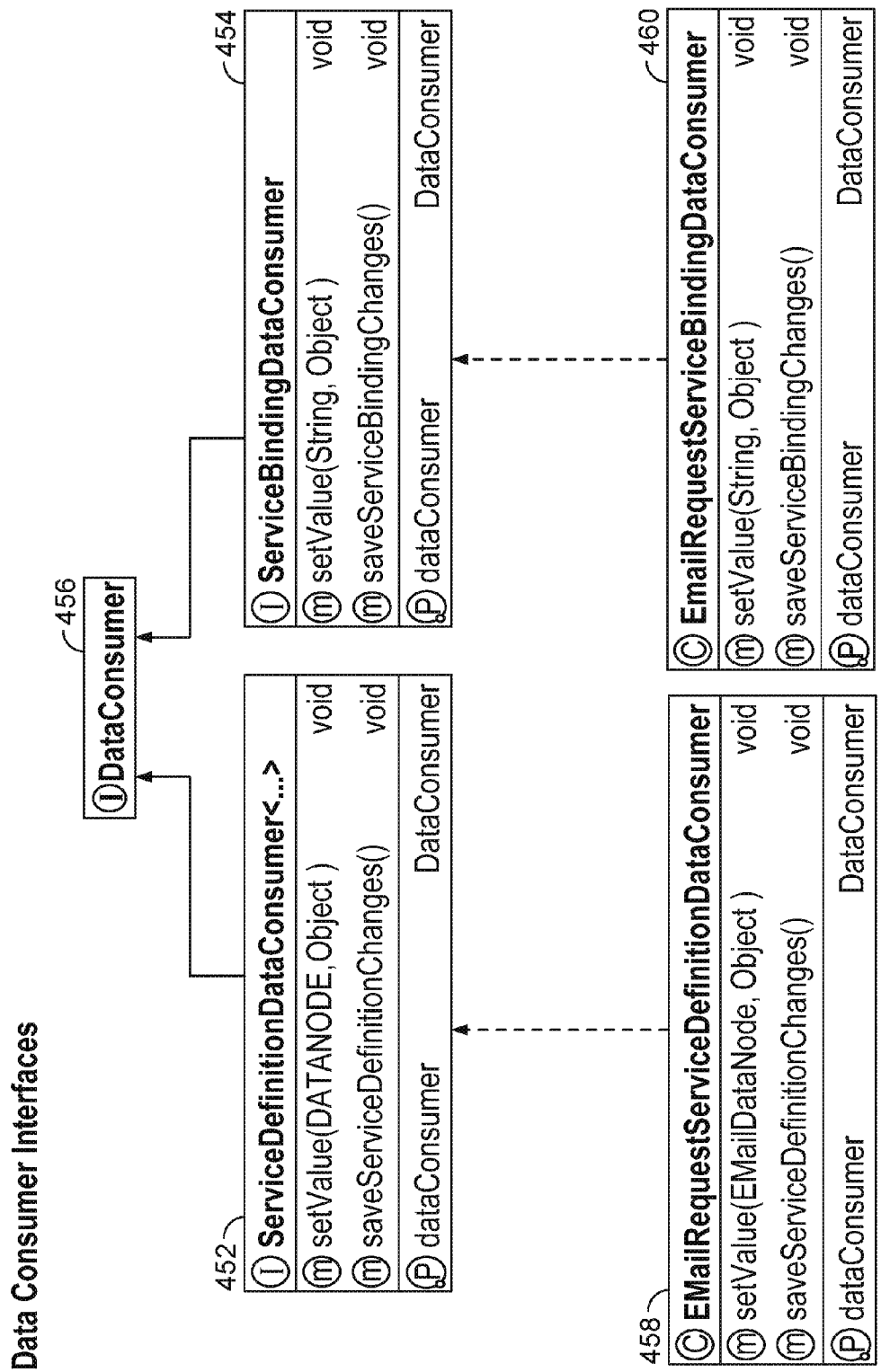
FIG. 4C is a class diagram illustrating a data consumer interface.

FIG. 4C is a class diagram illustrating a data consumer interface. Similar to FIG. 4B, both interfaces ServiceDefinitionDataConsumer (452) and ServiceBindingDataConsumer (454) inherit from interface DataConsumer (456). The EmailRequestServiceDefinitionDataConsumer class (458) implements interface ServiceDefinitionDataConsumer (452) and the EmailRequestServiceBindingDataConsumer class (460) implements interface ServiceBindingDataConsumer (454). In one embodiment, the Service definition provides for legacy notation as in FIG. 4B.

FIG. 4D is a class diagram illustrating a Service binding relationship. The Service executor understands a Service binding and executes input mappings, followed by a Service execution, and then output data mapping, as shown in the diagram and the relationship between class ServiceBindingServiceExecutor and class ServiceBindingDataMapperExecutor.

Figure 5A:
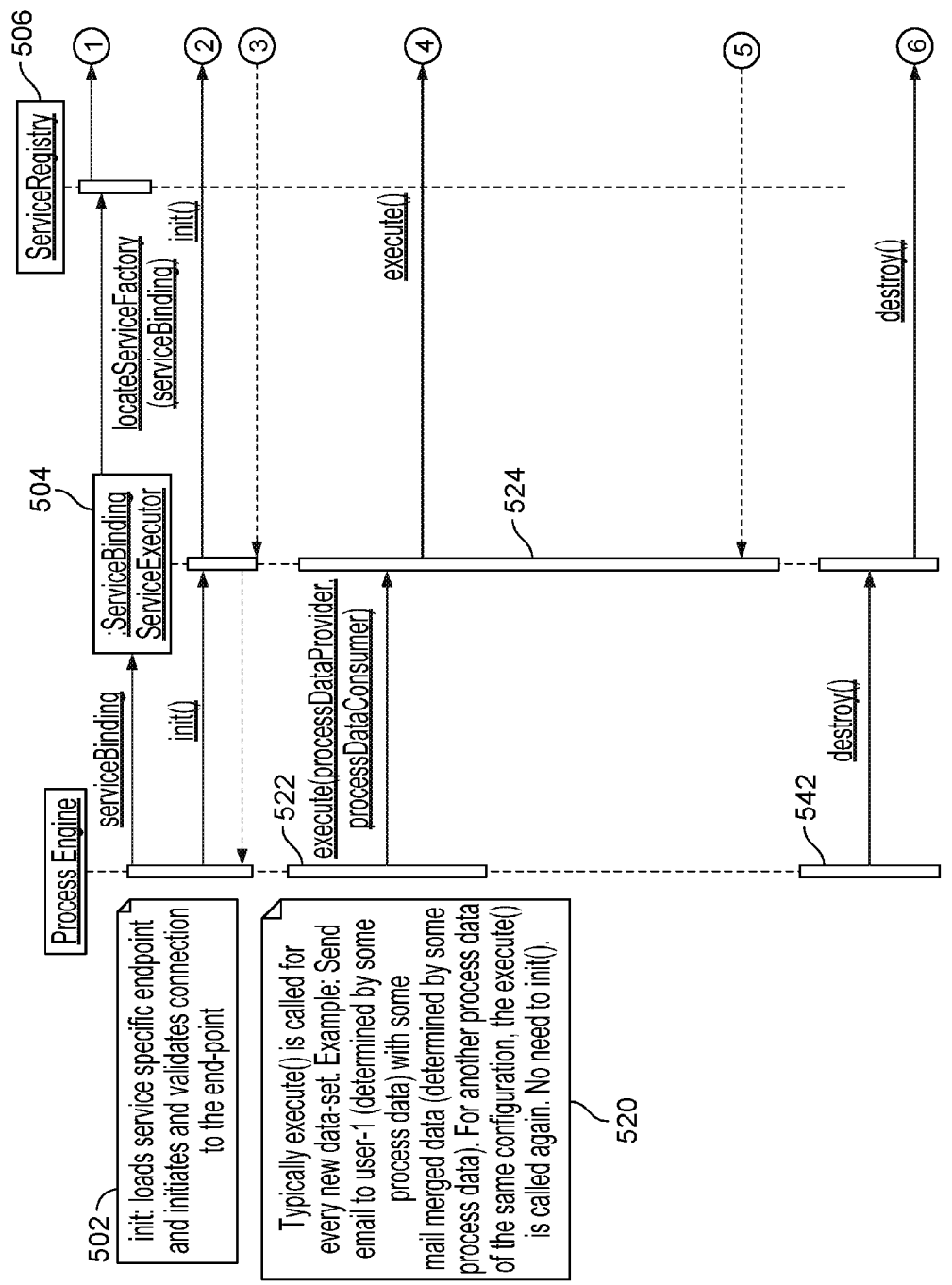
FIGS. 5A and 5B are a sequence diagram illustrating use of the Service binding framework.
Figure 5B:
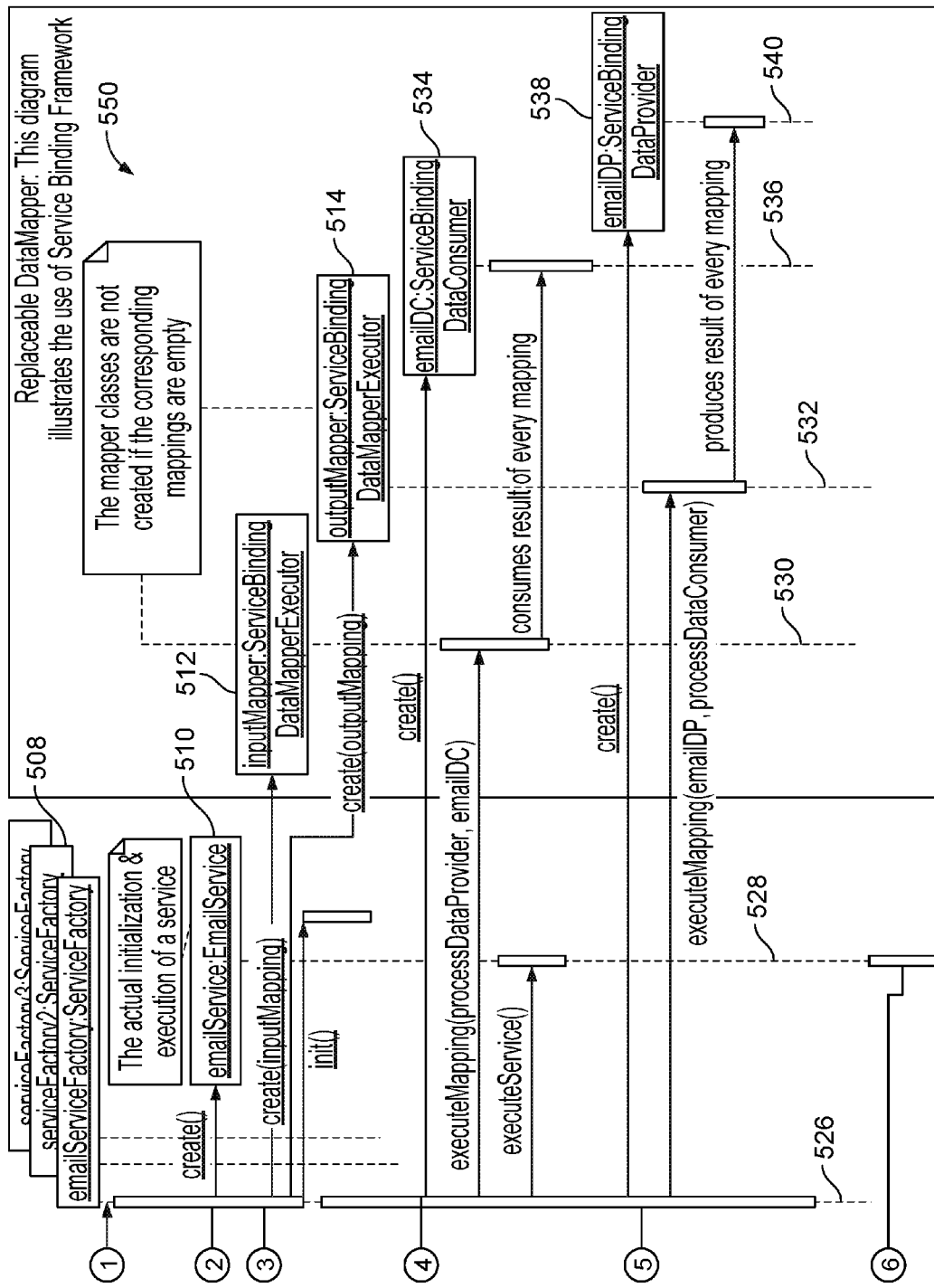

FIGS. 5A and 5B are a sequence diagram illustrating use of the Service binding framework. With regards to (502), (504), (506), (508), (510), (512), and (514), ProcessEngine or any other caller first locates the service in a Service registry by service name and then initializes it one time. If the service name happens to be say an "EmailService" which earlier registered itself with ServiceRegistry with that name, the EmailService is located and then caller initializes it.

With regards to (520), (522), (524), (526), (528), (530), (532), (534), (536), (538), and (540), for each request, based on the current context, the Service is executed. Input data mapping rules are evaluated based on current context data (Caller DataProvider. e.g. ProcessDataProvider, assigned to the Service side (DataConsumer, e.g. EmailRequestServiceBindingDataConsumer), executes the Service, and evaluates output mapping rules based on the data coming from the service execution (DataProvider, e.g. EmailResponseDataProvider) and assigns them to the Data Consumer (e.g. ProcessDataConsumer). With regards to (542), this framework also provides an API to destroy the service and in one embodiment, it is up to the system to determine when to destroy the service.

FIG. 6 is an illustration of an embodiment for a run-time model Service package in an API. In one embodiment, the interfaces include "Resource"; a destroyable resource and "ResourceContext"; used to keep track of resources like files, TCP connections, etc. that can be managed by the lifecycle of a Service execution. The package in FIG. 6 also includes by way of example classes including "EndPoint"; a Service endpoint definition, "ServiceBinding"; a Service binding configuration representation that uses a Spring expression language ("SpEL") expression to transform from one logical data source to another, "MappingRule"; used by "ServiceBinding" to represent a mapping rule that aids in transforming from one logical data-source to another, and "ServiceDefinition"; a legacy style configuration used to transform a logical data source to another using only the limited set of built-in functions.

Figure 7C:
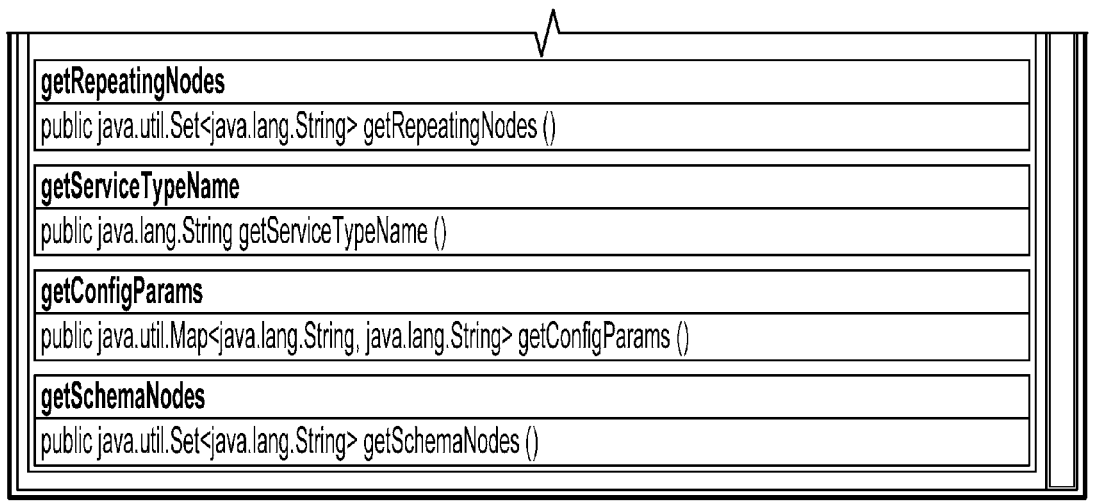
Figure 7D:
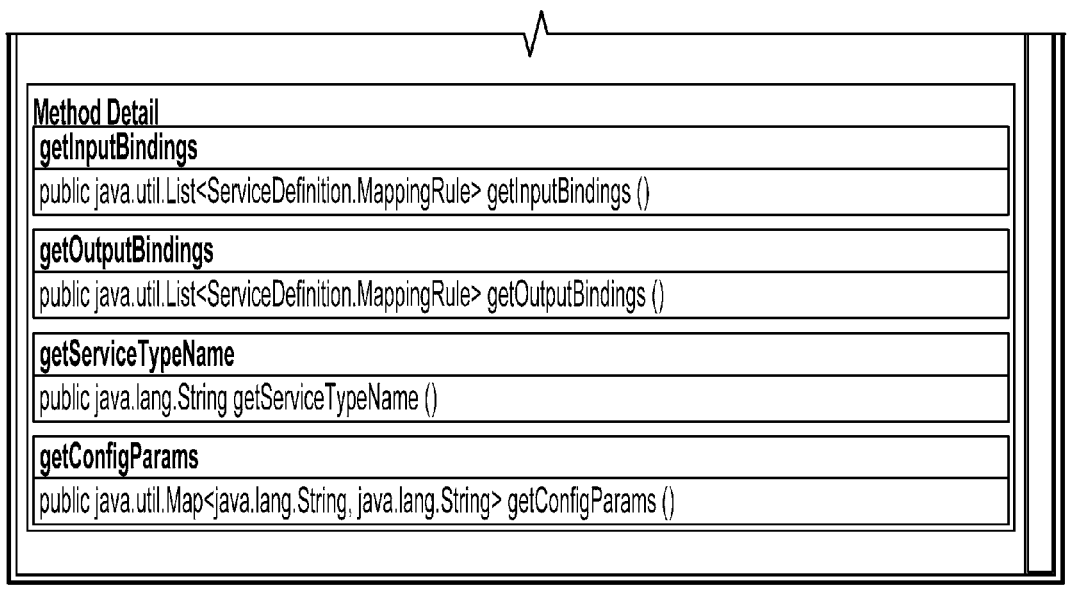
Figure 7E:
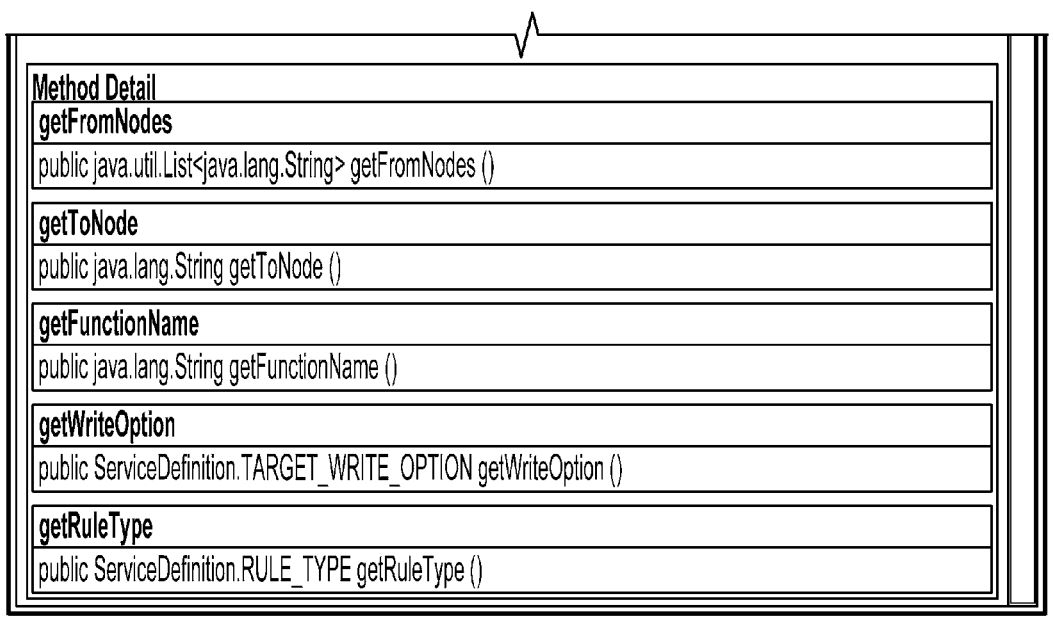

FIGS. 7A, 7B, 7C, 7D, 7E, 7F, and 7G are illustrations of an embodiment for classes and interfaces within the run-time model Service package. FIG. 7A is an example of a class definition for "EndPoint"; a Service endpoint definition including a method to get endpoint information as a name-value pair. FIG. 7B is an example of a class definition for "MappingRule"; used by "ServiceBinding" to represent a mapping rule that aids in transforming from one logical data-source to another, including a method to get an expression using constants (or variables based on the context of/from the data tree), and a method to get to a target node to transform an expression result. FIG. 7C is an example of a class definition for "ServiceBinding"; a Service binding configuration representation that uses a SpEL expression to transform from one logical data source to another. FIG. 7D is an example of a class definition for "ServiceDefinition"; a legacy style configuration used to transform a logical data source to another using only the limited set of built-in functions. FIG. 7E is an example of a class definition for "ServiceDefinition.MappingRule"; to perform the mapping of the legacy style configuration. FIG. 7F is an example of an interface "Resource"; a destroyable resource. FIG. 7G is an example of an interface "ResourceContext"; used to keep track of resources like files, TCP connections, etc. that can be managed by the lifecycle of a Service execution.

Figure 8:
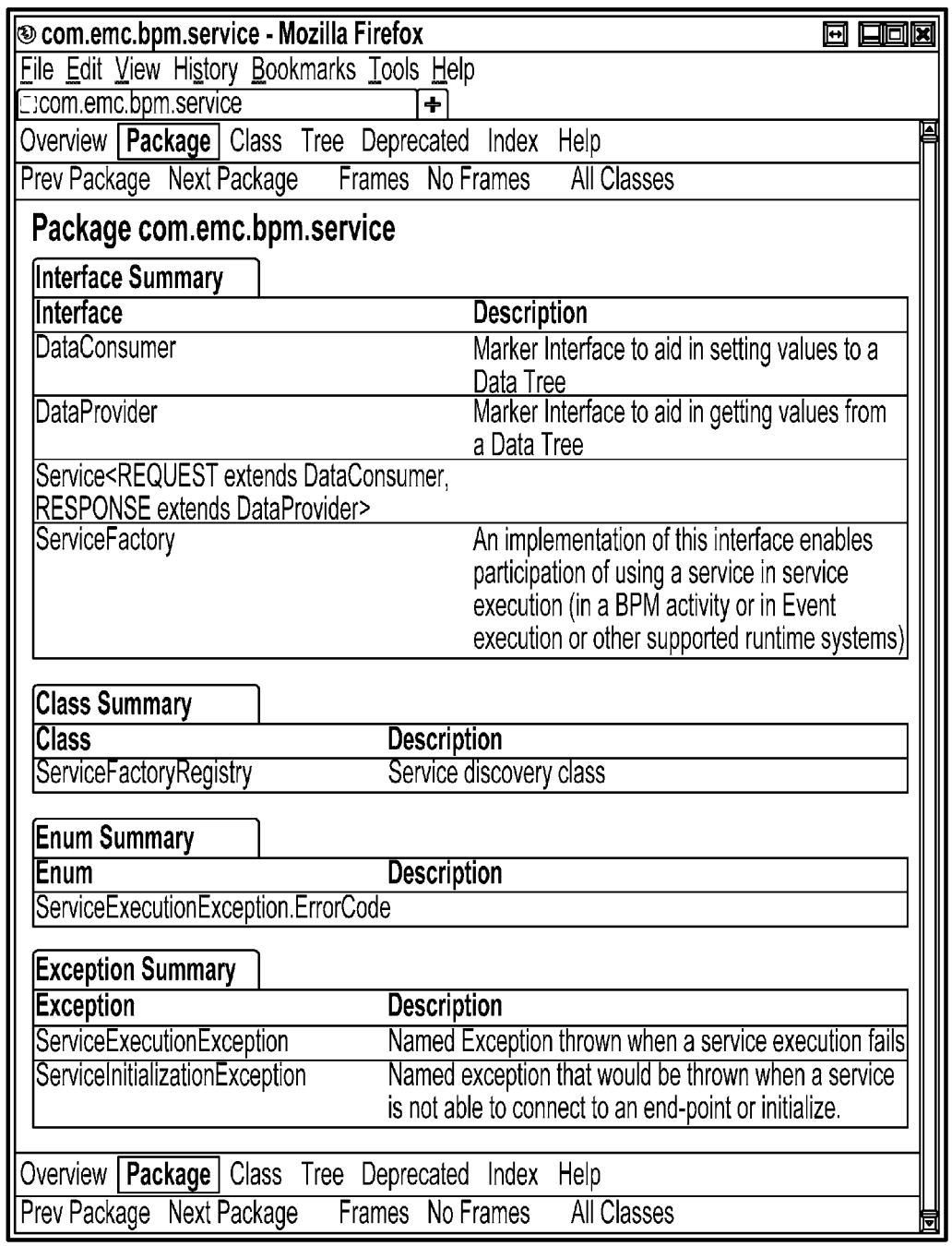
FIG. 8 is an illustration of an embodiment for a Service package in an API.

FIG. 8 is an illustration of an embodiment for a Service package in an API. In one embodiment, the interfaces include "DataConsumer"; a marker interface to aid in setting values to a data tree, "DataProvider"; a marker interface to aid in getting values from a data tree; "Service< >"; an interface representing the Service; and "ServiceFactory", an interface enabling participation of using a Service in Service execution, for example in a BPM activity, in Event execution, or other supported runtime systems like plain Java. The package in FIG. 8 also includes by way of example a class like "ServiceFactoryRegistry"; a Service discovery class.

Figure 9B:
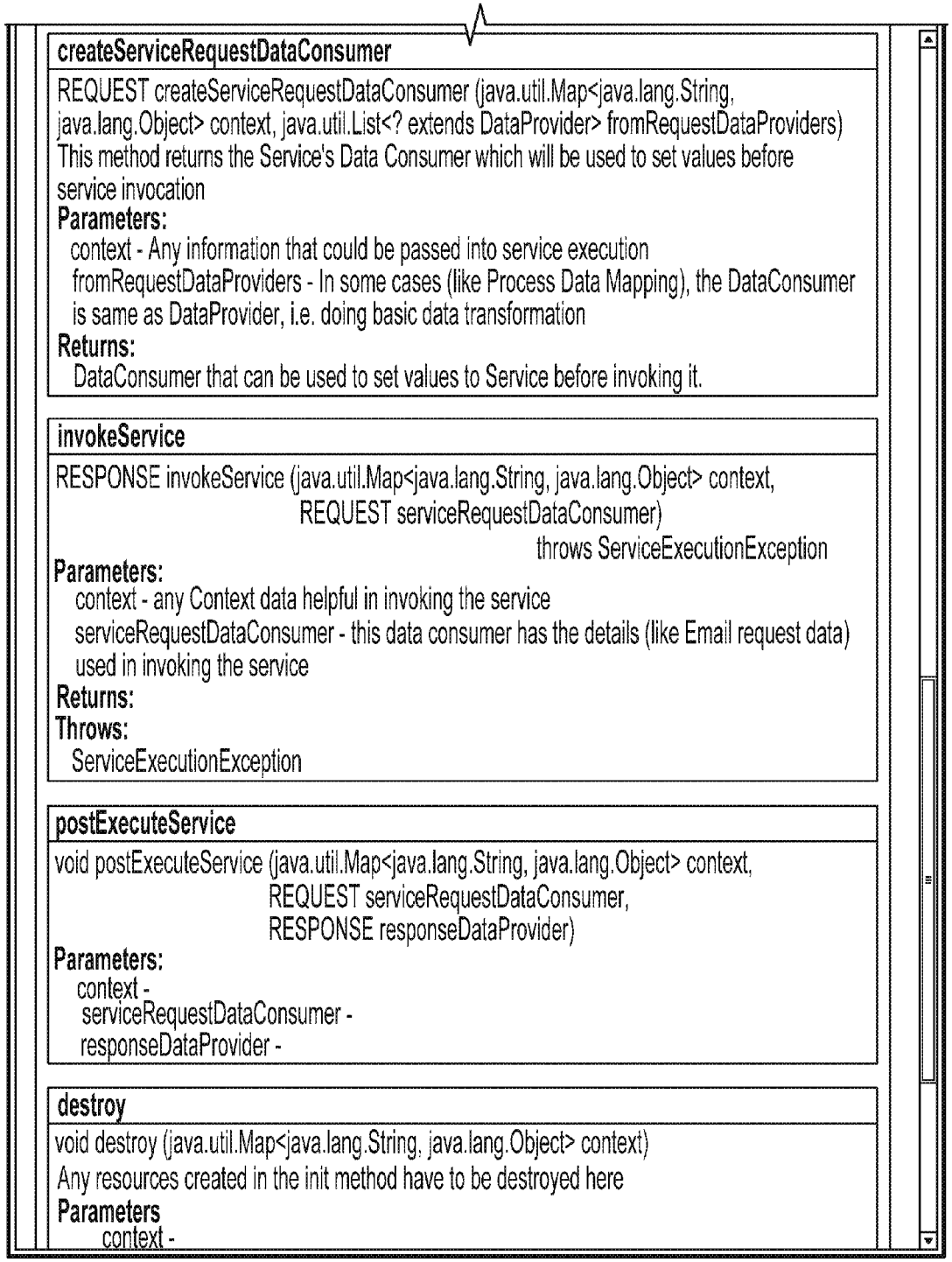

FIGS. 9A, 9B, and 9C are illustrations of an embodiment for classes and interfaces within the Service package. FIG. 9A is an example of a class definition for "ServiceFactoryRegistery"; a Service discovery class including a method for a (Spring) Bean Post Processor to add a given service factory to a registry (typically used in a non-OSGi environment), a method to finds a service factory handle for a given service name, and a method used by Spring BluePrint to register all service factories. FIG. 9B is an example of an interface "Service< >"; an interface representing the Service, including:

an init method to initialize any resources (for example, a JMS connection) and that can be reused across multiple invoke services, including a parameter for a map representing the endpoint information, e.g. Email Host and Port etc, a REQUEST/createServiceRequestDataConsumer method to return the Service's data consumer which will be used to set values before service invocation, including a parameter for context (information that could be passed into service execution), a parameter that allows in some cases like Process data mapping, the DataConsumer being the same as DataProvider—that is doing basic data transformation, and returns DataConsumer that can be used to set values to Service before invoking it, an invokeService method to invoke a Service, including a parameter for context (information that could be passed into service execution), and a parameter for a data consumer that has details (like email request data) used in invoking the service, and a destroy method to destroy any resources created in the init method.

FIG. 9C is an example of an interface "ServiceFactory"; an interface enabling participation of using a Service in Service execution, for example in a BPM activity, in Event execution, or other supported runtime systems like plain Java, including a method to create a new Service, and a method used as an identifier to discover a Service, wherein Services are typically discovered based on configuration provided using a ServiceDefinition or a ServiceBinding format.

FIG. 10 is an illustration of an embodiment for a Service mapper package in an API. In one embodiment, the interfaces include "BPMServiceFactory"; a ServiceFactory extension that provides support for ServiceBinding and/or ServiceDefinition abstraction in order to enable a Service implementer to call the service from ServiceBinding/ServiceDefinition, "BPMServiceFactoryRegistryService"; a Service discovery interface, "ServiceBindingDataConsumer"; an interface to aid in setting values to a data tree for a configuration provided using Service binding, "ServiceBindingDataProvider"; an interface to aid in getting values from a data tree for a configuration based on a Service binding, "ServiceDefinitionDataConsumer" an interface to aid in setting values to a data tree for a configuration provided using a Service definition, and "ServiceDefinitionDataProvider", an interface to aid in getting values from a data tree for a configuration based on a Service definition. The package in FIG. 10 also includes by way of example classes like "BPMServiceFactoryRegistryServiceImpl"; a Service discovery class and "ServiceHandler"; a context class that allows inter-operability with non-Spring classes.

FIG. 11 is an illustration of an embodiment for a class within the Service mapper package. FIG. 11 is an example of "BPMServiceFactoryRegistryServiceImpl"; a Service discovery class, including a getServiceFactory method to find the service factory handle for a given service name, an addServiceFactory method used by (Spring) Bean Post Processor to add a given service factory to this registry (typically used in an non-OSGi environment), and a setServiceFactories method used by Spring BluePrint to register all service factories.

FIG. 12 is an illustration of an embodiment for a Service SB package in an API. In one embodiment the classes include "ServiceBindingDataMapperExecutor"; a framework class that allows execution of mapping rules during the execution of every Service binding configuration that is an internal class and would not have any significance to the implementer of the Service, "ServiceBindingServiceExecutor"; a class that executes any Service, and "ServiceBindingVariableTypeInfoProvider"; a framework class that allows getting more information on variables using an expression that is part of a ServiceBinding configuration.

FIGS. 13A, 13B, and 13C are an illustration of an embodiment for a Service binding Service executor class. FIG. 13A-C are an example of "ServiceBindingServiceExecutor"; a class which executes any Service. Again, a Service is an execution logic for an automatic activity. This Service executor is based on ServiceBinding. In one embodiment, there are other kinds of executors that are more suitable in an non-automatic activity context. This class includes methods:

an init method to initialize a Service provided in the Service binding configuration using parameters including context used for processing the init( ) when the service is initialized, an execute method to execute a service that may not have any output mapping using parameters including context used for processing the execution of service, and a fromRequestDataProviders parameter for data providers that participate in the Service binding, for example ProcessDataProvider when used in an BPM activity, an execute method to execute a service that have both input and output mapping using parameters including context used for processing the execution of service, a fromRequestDataProviders parameter for data providers that participate in the Service binding, for example ProcessDataProvider when used in an BPM activity, and a toResponseDataConsumer parameter for data consumers that participate in the Service binding, for example ProcessDataConsumer when used in an BPM Activity), and a destroy method for Service cleanup during shutdown of the service and/or when the service is not required to be loaded in memory.

Figure 14:
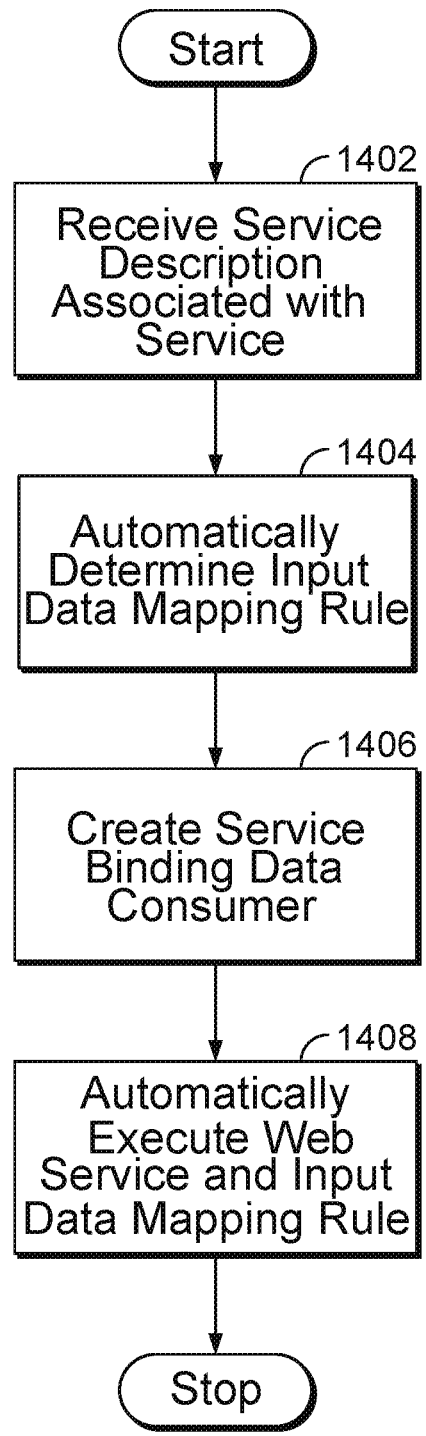
FIG. 14 is a block diagram illustrating an embodiment of a process for an extensible Service execution framework with a data mapping architecture.

FIG. 14 is a block diagram illustrating an embodiment of a process for an extensible Service execution framework with a data mapping architecture. In one embodiment, the process of FIG. 14 is executed in the system of FIG. 1.

In step 1402, a Service description associated with a Service is received. In one embodiment, the service is a web Service. In one embodiment, the Service description is received during design-time. In one embodiment, the Service description is received in EMC Documentum xCP Designer. In one embodiment, the Service description conforms to an API like that described in FIGS. 6 through 13C. In one embodiment, the web Service is associated with a REST architectural style. In one embodiment, the web Service is invoked from a BPM, an Event and/or from Java.

In step 1404, an input data mapping rule is automatically determined from a first Caller context to a Service context associated with the web Service at least in part by transforming the Service description. In one embodiment, the input data mapping rule is automatically determined at design-time. In one embodiment, a step (not shown) is further included automatically determining an output data mapping rule from the Service context to a second Caller context at least in part by transforming the Service description. In one embodiment, the output data mapping rule is automatically determined during design-time. In one embodiment, the second Caller context is the same as the first Caller context, that is from the same BPM, Event, and/or Java application.

In step 1406, a Service binding data consumer is created based at least in part on the Service description. In one embodiment, the Service binding data consumer is created at run-time. In one embodiment, a step (not shown) is further included creating a Service binding data provider based at least in part on the Service description. In one embodiment, the Service binding data provider is created during run-time.

In step 1408, the service and the input data mapping rule between the first Caller context and the Service context is automatically executed. In one embodiment, the web Service and the input data mapping rule are automatically executed during run-time. In one embodiment, a step (not shown) is further included automatically executing the web Service and the output data mapping rule between the Service context and a second Caller context. In one embodiment, the web Service and the output data mapping rule are automatically executed during run-time. In one embodiment, the second Caller context is the first Service context, that is the Service outputs to itself. In one embodiment, the second Caller context is a next Service context, that is the results from the first Service are "daisy chained" to a second Service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a service description associated with a BPM ("business process management") system web service during a tooling stage;
    automatically determining at the tooling stage an input data mapping rule from a first caller context to a service context associated with the BPM system web service at least in part by transforming the service description, wherein:
        the first caller is a data provider; and
        the data provider comprises data in a hierarchical relationship;
    automatically determining at the tooling stage a service type name string to invoke the BPM system web service;
    creating a service binding data consumer at a run-time stage based at least in part on the service description; and
    automatically executing the BPM system web service and the input data mapping rule between the first caller context and the service context during the run-time stage.

2. A method as recited in claim 1, wherein the service description is received during design-time.

3. A method as recited in claim 1, wherein the service description is received in EMC Documentum xCP Designer.

4. A method as recited in claim 1, wherein the service description conforms to an application programming interface ("API").

5. A method as recited in claim 1, wherein the BPM system web service is a web service associated with a Representational State Transfer ("REST") architectural style.

6. A method as recited in claim 1, wherein the BPM system web service is a web service that can be invoked from within one or more of the following: a BPM, an Event, and from Java.

7. A method as recited in claim 1, wherein the input data mapping rule is automatically determined during design-time.

8. A method as recited in claim 1, further comprising automatically determining an output data mapping rule from the service context to a second caller context at least in part by transforming the service description.

9. A method as recited in claim 8, wherein the output data mapping rule is automatically determined during design-time.

10. A method as recited in claim 8, wherein the second caller context is the same as the first caller context.

11. A method as recited in claim 1, where in the service binding data consumer is created during run-time.

12. A method as recited in claim 1, further comprising creating a service binding data provider based at least in part on the service description.

13. A method as recited in claim 12, wherein the service binding data provider is created during run-time.

14. A method as recited in claim 1, wherein the BPM system web service is a web service and the input data mapping rule are automatically executed during run-time.

15. A method as recited in claim 1, further comprising automatically executing the BPM system web service, wherein the BPM system web service is a web service, and the output data mapping rule between the service context and a second caller context.

16. A method as recited in claim 15, wherein the BPM system web service and the output data mapping rule are automatically executed during run-time.

17. A method as recited in claim 15, wherein the second caller context is the first service context.

18. A method as recited in claim 15, wherein the second caller context is a next service context.

19. A system, comprising:
    a memory bi-directionally coupled to a processor and configured to provide the processor with a set of instructions; and
    the processor to execute the set of instructions, wherein the set of instructions include steps to:
        receive a service description associated with a BPM ("business process management") system web service during tooling stage;
        automatically determine at the tooling stage an input data mapping rule from a first caller context to a service context associated with the BPM system web service at least in part by transforming the service description, wherein:
            the first caller is a data provider; and
            the data provider comprises data in a hierarchical relationship;
        automatically determine at the tooling stage a service type name string to invoke the BPM system web service;
        create a service binding data consumer at a run-time stage based at least in part on the service description; and
        automatically execute the BPM system web service and the input data mapping rule between the first caller context and the service context during the run-time stage.

20. A computer program product, the computer program product being embodied in a non-transitory computer readable storage medium and comprising computer instructions for:
    receiving a service description associated with a BPM ("business process management") system web service during a tooling stage;
    automatically determining at the tooling stage an input data mapping rule from a first caller context to a service context associated with the BPM system web service at least in part by transforming the service description, wherein:
        the first caller is a data provider; and
        the data provider comprises data in a hierarchical relationship;
    automatically determining at the tooling stage a service type name string to invoke the BPM system web service;
    creating a service binding data consumer at a run-time stage based at least in part on the service description; and
    automatically executing the BPM system web service and the input data mapping rule between the first caller context and the service context during the run-time stage.

* * * * *